United States Patent
Mah et al.

(10) Patent No.: US 8,697,280 B2
(45) Date of Patent: Apr. 15, 2014

(54) ELECTRODE ACTIVE MATERIAL, METHOD OF PREPARING ELECTRODE ACTIVE MATERIAL, ELECTRODE INCLUDING ELECTRODE ACTIVE MATERIAL, AND LITHIUM SECONDARY BATTERY INCLUDING ELECTRODE

(75) Inventors: Sang-kook Mah, Seoul (KR); Gue-sung Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 203 days.

(21) Appl. No.: 13/242,347

(22) Filed: Sep. 23, 2011

(65) Prior Publication Data

US 2012/0258362 A1  Oct. 11, 2012

(30) Foreign Application Priority Data

Apr. 8, 2011  (KR) .................. 10-2011-0032724

(51) Int. Cl.
- H01M 4/62 (2006.01)
- B05D 1/36 (2006.01)
- B05D 7/24 (2006.01)

(52) U.S. Cl.
USPC ......... 429/209; 429/232; 427/215; 427/419.1

(58) Field of Classification Search
USPC ............. 429/209, 218.1, 232; 427/215, 419.1
See application file for complete search history.

(56) References Cited

U.S. PATENT DOCUMENTS

| | | | | |
|---|---|---|---|---|
| 6,589,696 | B2* | 7/2003 | Matsubara et al. | 429/231.8 |
| 7,282,302 | B2 | 10/2007 | Visco et al. | |
| 7,335,446 | B2* | 2/2008 | Chiga et al. | 429/231.3 |
| 7,364,793 | B2* | 4/2008 | Paulsen et al. | 429/218.1 X |
| 8,182,939 | B2* | 5/2012 | Kim et al. | 429/209 |
| 2006/0147797 | A1 | 7/2006 | Wu et al. | |
| 2007/0099088 | A1* | 5/2007 | Kwon et al. | 429/232 |
| 2010/0203388 | A1* | 8/2010 | Kim et al. | 429/223 |

FOREIGN PATENT DOCUMENTS

| | | |
|---|---|---|
| JP | 10-003920 | 6/1998 |
| JP | 2000-012018 | 1/2000 |
| JP | 2003-059492 | 2/2003 |
| JP | 2005-166684 | 6/2005 |
| JP | 2006-100083 | 4/2006 |
| JP | 10-2009-21768 | 3/2009 |
| JP | 2009-054484 | 3/2009 |
| JP | 2009-181807 | 8/2009 |
| KR | 1020060069738 A | 6/2006 |

(Continued)

OTHER PUBLICATIONS

Computer-generated English translation of JP-2003-049592, from the Japanese Patent Office website (doc date Feb. 2003).*

Primary Examiner — Stephen J. Kalafut

(74) Attorney, Agent, or Firm — Cantor Colburn LLP

(57) ABSTRACT

An electrode active material, a method of preparing the electrode active material, an electrode including the electrode active material, and a lithium secondary battery including the electrode; the electrode active material comprising a core active material; and a coating layer formed on a surface of the core active material, wherein the coating layer comprises a composition including a compound represented by Formula 1 below and a carbonaceous material, or a first coating layer including a carbonaceous material and a second coating layer including the compound represented by Formula 1 below:

$$Li_xM_y(PO_4)_z,\quad \text{Formula 1}$$

where M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

11 Claims, 2 Drawing Sheets

(56) References Cited

FOREIGN PATENT DOCUMENTS

| KR | 1020070005149 A | 1/2007 |
|---|---|---|
| KR | 1020070058245 A | 6/2007 |
| KR | 1020070102881 A | 10/2007 |
| KR | 100790852 B1 | 12/2007 |
| KR | 1020090009053 A | 1/2009 |
| KR | 1020090020321 A | 2/2009 |
| KR | 1020090072533 A | 7/2009 |
| KR | 1020090084233 A | 8/2009 |
| KR | 1020100052276 A | 5/2010 |
| KR | 1020100066026 A | 6/2010 |
| KR | 1020110072919 A | 6/2011 |

\* cited by examiner

ELECTRODE ACTIVE MATERIAL, METHOD OF PREPARING ELECTRODE ACTIVE MATERIAL, ELECTRODE INCLUDING ELECTRODE ACTIVE MATERIAL, AND LITHIUM SECONDARY BATTERY INCLUDING ELECTRODE

CROSS-REFERENCE TO RELATED APPLICATIONS

This application claims the benefit of Korean Patent Application No. 10-2011-0032724, filed on Apr. 8, 2011, in the Korean Intellectual Property Office, the disclosure of which is incorporated herein in its entirety by reference.

BACKGROUND OF THE INVENTION

1. Field

The present disclosure relates to electrode active materials, methods of preparing the electrode active materials, electrodes including the electrode active materials, and lithium secondary batteries including the electrodes.

2. Description of the Related Art

Recently, lithium secondary batteries are being used as power sources for portable compact electronic devices. Lithium secondary batteries have high energy density because they use organic electrolytes, and thus the discharge voltage of the lithium secondary batteries is at least two times greater than that of batteries using conventional alkali aqueous electrolyte solutions.

In lithium secondary batteries, materials capable of intercalating and deintercalating lithium ions are used in the negative electrode, and the positive electrode, respectively, and an organic electrolytic solution or a polymer electrolytic solution fills the space between the positive electrode and negative electrode. In lithium secondary batteries, when lithium ions are intercalated or deintercalated, an oxidation reaction and a reduction reaction occur, respectively, and electric energy is generated due to the oxidation reaction and the reduction reaction.

A metal or a metal oxide as well as a carbon material such as graphite may be used as the negative active material of a lithium secondary battery.

However, except for carbon materials, negative active materials that have been developed so far do not have competent levels in charge/discharge capacities and capacity retention rates and thus, require further development.

SUMMARY OF THE INVENTION

The invention provides electrode active materials having improved charge/discharge capacities and capacity retention rates, methods of preparing the electrode active materials, electrodes including the electrode active materials, and lithium secondary batteries including the electrodes.

Additional aspects and/or advantages of the invention will be set forth in part in the description which follows and, in part, will be obvious from the description, or may be learned via practice of the invention by those skilled in the art.

According to an aspect of the invention, the electrode active material includes a core active material, and a coating layer formed on a surface of the core active material, wherein the coating layer comprises a composition including a compound represented by Formula 1 below and a carbonaceous material, or a first coating layer including a carbonaceous material and a second coating layer including the compound represented by Formula 1 below:

$$Li_xM_y(PO_4)_z \qquad \text{Formula 1}$$

where M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

Another aspect of the invention relates to a method of preparing the above-described electrode active material comprising providing a mixture of a compound represented by Formula 1 below or a precursor thereof, a carbonaceous material or a precursor thereof, and a first solvent; coating and drying the mixture on a core active material; and heat-treating the mixture:

$$Li_xM_y(PO_4)_z \qquad \text{Formula 1}$$

where M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

Another aspect of the invention concerns a method of preparing the above-described electrode active material comprising providing a first mixture of a carbonaceous material or a precursor thereof, and a second solvent; coating and drying the first mixture on a core active material; providing a second mixture of a compound represented by Formula 1 below or a precursor thereof, and a third solvent; coating and drying the second mixture on the first coating layer on the electrode active material; and heat-treating the dried mixture:

$$Li_xM_y(PO_4)_z, \qquad \text{Formula 1}$$

where M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

Another aspect of the invention relates to an electrode including an electrode active material comprising a core active material; and a coating layer formed on a surface of the core active material, wherein the coating layer comprises a composition including a compound represented by Formula 1 below and a carbonaceous material, or a first coating layer including a carbonaceous material and a second coating layer including the compound represented by Formula 1 below:

$$Li_xM_y(PO_4)_z \qquad \text{Formula 1}$$

where M is selected from the group consisting of alkali metal, alkaline earth metal, a group 13 element, a group 14 element, a transition metal, a rare earth element, and combinations thereof $1 \leq x \leq 3$, $0 \leq y \leq 3$, and $1 \leq z \leq 3$.

Another aspect of the invention concerns a lithium secondary battery which includes the above-described electrode.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
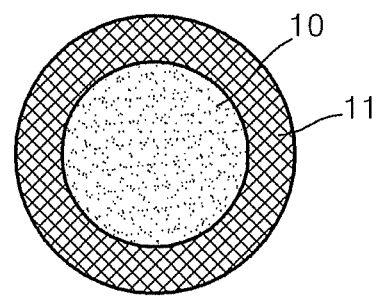
FIGS. 1A and 1B are schematic cross-sectional views of a structure of an electrode active material, according to an embodiment of the invention.

Reference will now be made in detail to the present embodiments of the invention, examples of which are illustrated in the accompanying drawings, wherein like reference numerals refer to like elements throughout. The embodiments are described below in order to explain the invention by referring to the figures.

An electrode active material according to an embodiment of the invention includes a core active material; and a coating layer formed on a surface of the core active material, wherein the coating layer comprises a composition including a compound represented by Formula 1 below and a carbonaceous material, or a first coating layer including a carbonaceous material and a second coating layer including the compound represented by Formula 1 below.

$$Li_xM_y(PO_4)_z \qquad \text{Formula 1}$$

In Formula 1, M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

In Formula 1, x is, for example, from about 1.1 to about 1.5; y is, for example, from about 0.1 to about 0.5 and z is, for example, from about 1.5 to about 1.9.

In the composition including the compound represented by Formula 1 and the carbonaceous material, the amount of the carbonaceous material may range from about 3 to about 95 parts by weight based on 100 parts by the total weight of the composition.

The amount of the carbonaceous material may be adjusted according to the capacity of the electrode, or design of the battery. If the amount of the carbonaceous material is within the range described above, the discharge capacity of the electrode active material is excellent.

In the first coating layer, the amount of the carbonaceous material may range from about 5 to about 500 parts by weight based on 100 parts by the total weight of the compound represented by Formula 1 in the second coating layer.

In the electrode active material wherein the coating layer comprises a first coating layer and a second coating layer, if the amounts of the carbonaceous material and the compound represented by Formula 1 are within the ranges described above, the capacity retention rate is excellent.

The total thickness of the coating layer may range from about 0.5 to about 400 nm. If the total thickness of the coating layer is within the range described above, the electrode active material has excellent discharge capacity and capacity retention rate characteristics.

The first coating layer and the second coating layer may each have a thickness from about 0.5 to about 200 nm; for example, from about 2 to about 20 nm.

If the thicknesses of the first coating layer and the second coating layer are within the range described above, the electrode active material has excellent discharge capacity and capacity retention rate characteristics.

In Formula 1, M may be selected from the group consisting of sodium (Na), potassium (K), magnesium (Mg), calcium (Ca), strontium (Sr), nickel (Ni), cobalt (Co), silicon (Si), titanium (Ti), boron (B), aluminum (Al), tin (Sn), manganese (Mn), chromium (Cr), iron (Fe), vanadium (V), zirconium (Zr), yttrium (Y), lanthanum (La), scandium (Sc), indium (In), gallium (Ga), germanium (Ge), and combinations thereof.

The compound represented by Formula 1 may be $Li_{1.3 \pm 0.2}Al_{0.3 \pm 0.2}Ti_{1.7 \pm 0.2}(PO_4)_3$; for example, $Li_{1.3}Al_{0.3}Ti_{1.7}(PO_4)_3$.

The compound represented by Formula 1 may be an amorphous material.

The core active material may be any material that is generally used as a positive or negative active material in a lithium secondary battery.

Nonlimiting examples of the core active material may include at least one first material selected from the group consisting of Si, $SiO_a$ ($0<a<2$), an Si alloy, Sn, $SnO_b$ ($0<b \leq 2$), and a Sn alloy, or a second material including the first material and at least one selected from the group consisting carbon, metal, and an oxide.

The metal may be iron (Fe), aluminum (Al), titanium (Ti), copper (Cu), nickel (Ni), an alloy thereof, or the like. The oxide may be selected from the group consisting of $Al_2O_3$, $TiO_2$, $ZrO_2$, Li-containing $SiO_2$, Li-containing $Al_2O_3$, Li-containing $TiO_2$, Li-containing $ZrO_2$, and combinations thereof.

Figure 1B:
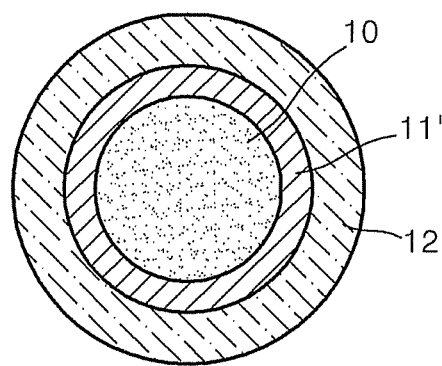

FIGS. 1A and 1B are schematic cross-sectional views of a structure of an electrode active material, according to an embodiment of the invention.

Referring to FIG. 1A, the coating layer 11 comprises a composition including a compound represented by Formula 1 and a carbonaceous material formed on a surface of the core active material 10.

Referring to FIG. 1B, a first coating layer 11' including a carbonaceous material is formed on a surface of the core active material 10, and a second coating layer 12 including the compound represented by Formula 1 is formed on the first coating layer 11'.

Hereinafter, a method of preparing the electrode active material of FIG. 1A will be described.

A compound represented by Formula 1 below or a precursor thereof, a carbonaceous material or a precursor thereof, and a first solvent are mixed to obtain a mixture.

$$Li_xM_y(PO_4)_z \qquad \text{Formula 1}$$

In Formula 1, M is selected from the group consisting of alkali metal, alkaline earth metal, a group 13 element, a group 14 element, a transition metal, a rare earth element, and combinations thereof; $1 \leq x \leq 3$, $0 \leq y \leq 3$, and $1 \leq z \leq 3$.

A precursor of the compound represented by Formula 1 may be prepared as follows.

First, a Li compound, a metal (M) compound, a phosphoric compound, and a first solvent are stirred and dried to obtain a mixture.

The Li compound may be lithium nitrate ($LiNO_3$), lithium carbonate, lithium hydroxide (LiOH), or the like.

The metal compound may be titanium alkoxide, aluminum nitrate, titanium oxide, aluminum oxide, or the like.

The phosphoric compound may be diammonium hydrogen phosphate (($NH_4$)$_2HPO_4$), or the like.

The first solvent may be distilled water, alcohol, acetone, tetrahydrofuran (THF), or the like.

Citric acid is added to the mixture including the Li compound, the metal compound, the phosphoric compound, and the solvent.

Amounts of the Li compound, the metal compound, and the phosphoric compound are controlled so as to obtain the compound represented by Formula 1.

The precursor of the compound represented by Formula 1, as a target material, may be obtained by removing the solvent component from the mixture including the Li compound, the metal compound, the phosphoric compound, and the solvent.

The compound represented by Formula 1 may be obtained by performing heat-treatment of the precursor of the compound represented by Formula 1 at a temperature of about 150 to about 1500° C., for example, about 350 to about 1500° C. in air or inert gas such as nitrogen or argon atmosphere.

Examples of the carbonaceous material include graphite, such as natural graphite or artificial graphite; carbonaceous materials, such as carbon black, acetylene black, ketjen black, channel black, furnace black, lamp black, or summer black; conducting fibers, such as carbonaceous fibers or metal fibers; metal powder, such as carbon fluoride powders, aluminum powders, or nickel powders; conducting whiskers, such as zinc oxide or potassium titanate; and conducting metal oxides such as a titanium oxide.

The precursor of the carbonaceous material may be sucrose, pitch, polyvinyl alcohol (PVA), poly(vinylidene fluoride) (PVDF), or the like.

The amount of the carbonaceous material or the precursor thereof may range from about 3 to about 95 parts by weight based on 100 parts by the total weight of the composition including the compound represented by Formula 1 and the carbonaceous material. If the amount of the carbonaceous material or the precursor thereof is within the range described above, the electrode active material has an excellent discharge capacity.

The mixture including the compound represented by Formula 1 or the precursor thereof, the carbonaceous material or the precursor thereof, and the first solvent are coated on the core active material. Then, the resultant coating is dried, whereby the first solvent, and the like are removed.

Heat-treatment is performed on the dried resultant coating to prepare an electrode active material including a core active material, and a coating layer including a composition including a carbonaceous material and a compound represented by Formula 1.

The amount of the solvent may range from about 300 to about 100,000 parts by weight based on 100 parts by the total weight of the core active material. If the amount of the first solvent is within this range, the coating layer will be uniformly formed on a surface of the core active material.

The drying operation is performed from about room temperature, that is, about 20 to about 25° C. to a temperature of about 80° C. If the temperature for the drying operation is within this range, the coating layer will be uniformly coated on the core active material without any thickness deviation in the electrode active material.

During preparation of the mixture, if ultrasonic waves are applied when the mixture is stirred, components included in the composition for forming the coating layer of the core active material will be uniformly dissolved or dispersed.

The heat-treatment is performed at a temperature from about 150 to about 1500° C., for example, from about 350 to about 1500° C. In this case, the heat-treatment is performed in air or in an inert gas such as nitrogen or argon atmosphere.

Hereinafter, a method of preparing the electrode active material of FIG. 1B will be described.

A carbonaceous material or a precursor thereof, and a second solvent are mixed to obtain a first mixture.

The first mixture is coated on a core active material, and then is dried.

The core active material, and the carbonaceous material and the precursor thereof are selected from those described with reference to the method of preparing the electrode active material of FIG. 1A.

The electrode active material including the core active material and a first coating layer including the carbonaceous material or the precursor thereof, which is formed on the core active material, may be obtained by performing heat-treatment on the mixture from which the second solvent is removed.

The second solvent may be selected from materials used as the first solvent.

Separately, the compound represented by Formula 1 or the precursor thereof, and a third solvent are mixed and stirred to prepare a second mixture.

The compound represented by Formula 1 or the precursor thereof may be selected from those described with reference to the method of preparing the electrode active material of FIG. 1A.

The third solvent may be selected from materials used as the second solvent.

The second mixture is coated on the first coating layer on the electrode active material and the resultant coating dried, and then the third solvent is removed.

If an ultrasonic wave is applied when the mixture is stirred, the mixture will be uniformly dispersed.

Then, heat-treatment is performed on the dried resultant coating to prepare a coating layer formed on the core active material. In this case, the coating layer includes a first coating layer including a carbonaceous material and a second coating layer including the compound represented by Formula 1.

The heat-treatment is performed in air or in an inert gas atmosphere. The inert gas may be nitrogen or argon.

An electrode according to an embodiment of the invention may be prepared as follows. Hereinafter, a case where the electrode is a negative electrode will be described as a non-limiting example.

First, a composition for forming a negative active material layer is prepared by mixing an electrode active material according to an embodiment of the invention, a binder, and a solvent.

A conductive agent may be added to the composition for forming a negative active material layer.

The conductive agent may be any conducting material that does not cause chemical changes in batteries. For example, the conductive agent may be a carbonaceous material such as graphite, carbon black, acetylene black, ketjen black, channel black, furnace black, lamp black, or summer black.

The composition for forming the negative active material layer may further include a negative active material such as those conventionally used in the art.

Examples of the negative active material include carbonaceous materials, such as graphite or carbon, lithium metal, alloys thereof, and silicon oxides, which intercalate or deintercalate lithium ions.

Then, the composition for forming the negative active material layer is coated and dried on a current collector of a negative electrode to prepare a negative electrode.

A current collector that is used to manufacture the negative electrode may have a thickness of 3 to 500 μm, in general. The current collector used to form the negative electrode may be formed using any material that does not cause chemical changes in batteries and has high conductivity. The collector may be formed of copper, stainless steel, aluminum, nickel, titanium, or heat treated carbon. Alternatively, the collector may be a copper or stainless steel support that is surface-treated with carbon, nickel, titanium, or silver, or an aluminum-cadmium alloy. Like the positive electrode current collector, the collector may have a corrugated surface to facilitate a stronger attachment of the negative electrode active material to the collector. The collector may take various forms, such as a film, a sheet, a foil, a net, a porous product, a foam, or a nonwoven fabric.

The solvent may be N-methyl pyrrolidone (NMP), acetone, water, or a mixture thereof. The amount of the solvent is from about 50 to about 500 parts by weight based on 100 parts by the total weight of the negative active material. If the amount of the solvent is within this range, a negative active material layer will be easily formed.

A lithium secondary battery according to an embodiment of the invention includes the negative electrode described above. A method of preparing the lithium secondary battery will now be described.

In addition to the above-described negative electrode, a positive electrode is prepared as follows.

The positive electrode is prepared by coating and drying a composition for forming a positive active material layer on a current collector, as in the above-described method of preparing the negative electrode.

The composition for forming the positive active material layer may be prepared by mixing a positive active material, a conductive agent, a binder, and a solvent.

The positive active material may be a lithium transition metal oxide that is conventionally used as a positive active material in a lithium battery.

The conductive agent, the binder, and the solvent may be the same and used in the same amounts, as in the above-described method of preparing the negative electrode.

The lithium transition metal oxide may be at least one selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (0≤Y<1), $LiMn_{2-z}Ni_zO_4$, $LiMn_{2-z}Co_zO_4$ (0<Z<2), $LiCoPO_4$, and $LiFePO_4$.

The collector that is used to form the positive electrode may have a thickness of about 3 to about 500 μm, and may be formed of any material that does not cause chemical changes in batteries and has high conductivity. The collector may be formed of stainless steel, aluminum, nickel, titanium, heat treated carbon, or aluminum, or may be a stainless steel support that is surface-treated with carbon, nickel, titanium, or silver. The collector may have a corrugated surface and thus the positive electrode active material is more strongly attached thereto. The collector may have various forms, such as a film, a sheet, a foil, a net, a porous product, a foam, or a nonwoven fabric.

A lithium secondary battery is prepared by placing a separator between the positive electrode and the negative electrode, which are prepared by using the above-described methods and then applying an organic electrolyte solution.

The lithium secondary battery may be prepared, for example, by stacking the negative electrode, the separator, and the positive electrode in the order stated, winding or bending the resulting structure, putting the resulting structure in a square battery case or a pouch, and then injecting the organic electrolyte solution into the battery case or the pouch.

The separator may have an average pore diameter of about 0.01 to about 10 μm, and a thickness of about 5 to about 300 μm. The separator may be a sheet or a nonwoven fabric formed of an olefin-based polymer such as polypropylene or polyethylene, or of glass fiber.

The organic liquid electrolyte may be formed by dissolving a lithium salt in an organic solvent.

The organic solvent may be selected from the group consisting of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyl tetrahydrofuran, γ-butyrolactone, dioxolane, 4-methyldioxolane, N,N-dimethylformamide, dimethylacetamide, dimethylsulfoxide, dioxane, 1,2-dimethoxy ethane, sulfolane, dichloroethane, chlorobenzene, nitrobenzene, diethylene glycol, dimethylether, and combinations thereof.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each a natural number), LiCl, LiI, and combinations thereof.

A lithium secondary battery according to an embodiment of the invention may use an organic solid electrolyte and/or an inorganic solid electrolyte, in addition to the separator. In this case, if the organic solid electrolyte and/or the inorganic solid electrolyte are used, the organic solid electrolyte and/or the inorganic solid electrolyte may function as the separator, if necessary, and thus the separator may be eliminated.

Examples of the organic solid electrolyte include polyethylene derivatives, polyethylene oxide derivatives, polypropylene oxide derivatives, phosphate ester polymers, polyester sulfide, polyvinyl alcohol, and polyvinylidene fluoride.

Examples of the inorganic solid electrolyte include $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

Figure 2:
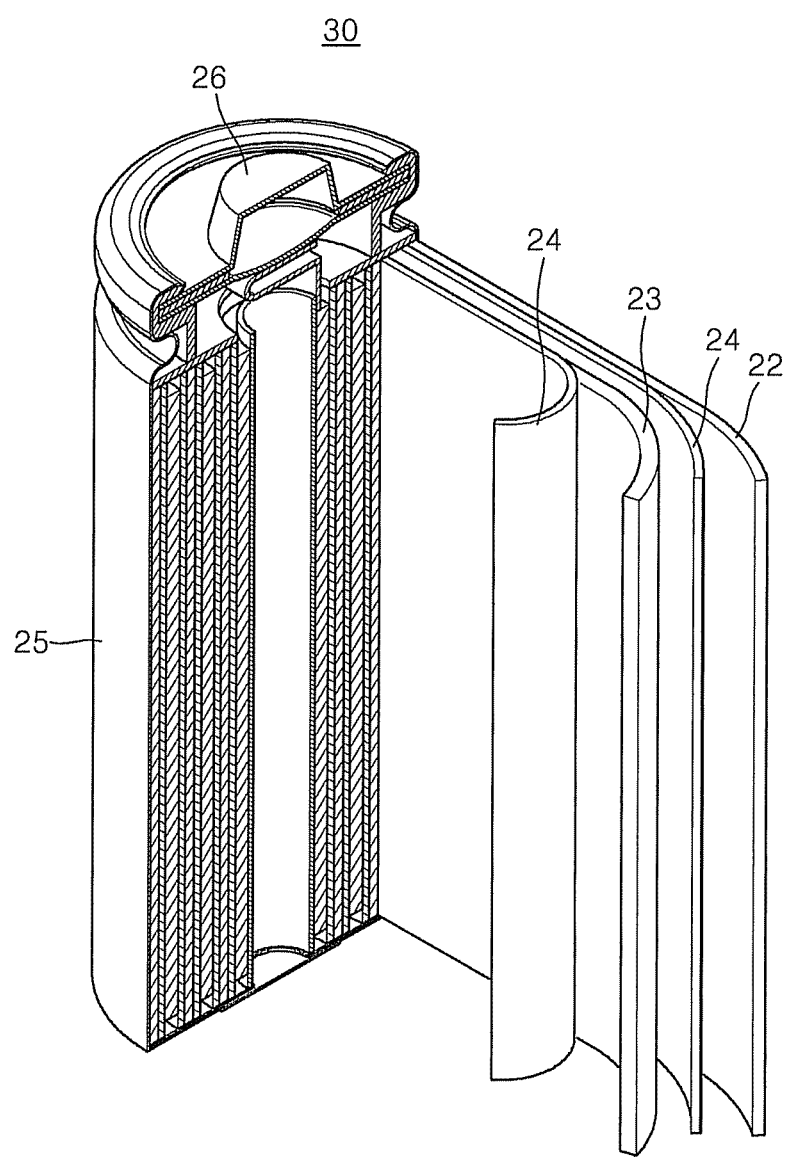
FIG. 2 is a cross-sectional schematic view of a lithium secondary battery according to an embodiment of the invention.

FIG. 2 is a cross-sectional schematic view of a lithium secondary battery 30 according to an embodiment of the invention.

Referring to FIG. 2 the lithium battery 30 includes a positive electrode 23, a negative electrode 22, a separator 24 between the positive electrode 23 and the negative electrode 22, a battery case 25, and a sealing member 26 for sealing the battery case 25. The positive electrode 23, the negative electrode 22, and the separator 24 are impregnated with an electrolyte (not shown). The lithium battery 30 is formed by sequentially stacking the positive electrode 23, the separator 24, and the negative electrode 22 and then winding the stack structure to form an electrode assembly which is placed in the battery case 25. The battery case 25 is then sealed with the sealing member 26.

Hereinafter, one or more embodiments of the invention will be described in detail with reference to the following examples. However, these examples are not intended to limit the purpose and scope of the one or more embodiments of the invention.

SYNTHESIS EXAMPLE 1

Preparation of Precursor of Lithium Phosphate 5.45 g of titanium butoxide ($Ti(OC_4H_9)_4$, Aldrich) was slowly added dropwise to an aqueous citric acid solution prepared by dissolving 6.5 g of citric acid in 80 g of distilled water at room temperature, and was continuously mixed for 12 hours to obtain a resulting solution. The resulting solution was mixed with an aqueous solution prepared by dissolving 0.97 g of $LiNO_3$, 3.45 g of $NH_4H_2PO_4$, and 5.1 g of citric acid in 70 g of distilled water. Thereafter, an aqueous solution prepared by dissolving 1.5 g of $Al(NO_3)_3.9H_2O$ and 1.5 g of citric acid in 19.4 of distilled water was mixed with the resulting solution, to thus obtain a white suspension solution. Ammonia water was slowly added dropwise to the white suspension solution until acidity reached neutral pH (which is 7), to thus prepare a translucent solution.

The translucent solution was stirred in a bath at a temperature of 80° C., and was dried, to thus prepare a viscous precursor of lithium phosphate of $Li_{1.3\pm0.2}Al_{0.3\pm0.2}Ti_{1.7\pm0.2}(PO_4)_3$.

PREPARATION EXAMPLE 1

Preparation of Electrode Active Material 0.45 g of Si particles having a diameter of about 300 nm were mixed with 0.1 g of sucrose and an aqueous solution prepared by dissolving 1.69 g of the precursor of lithium phosphate of $Li_{1.3\pm0.2}Al_{0.3\pm0.2}Ti_{1.7\pm0.2}(PO_4)_3$ prepared in Synthesis Example 1 in 5 g of distilled water, in a 50 ml vial. Then, ultrasonic waves were applied to the resultant mixture for one hour so as to disperse the Si particles.

Then, the dispersed mixture was stirred in a bath at a temperature of 80° C., and dried. The dried material was heat-treated at a temperature of 850° C. in a nitrogen atmosphere to prepare an electrode active material comprising a coating layer including a composition comprising a carbonaceous material and $Li_{1.3\pm0.2}Al_{0.3\pm0.2}Ti_{1.7\pm0.2}(PO_4)_3$, which was formed on the Si particles. In this case, the amount of the carbonaceous material was 50 parts by weight based on 100 parts by the total weight of the composition.

PREPARATION EXAMPLE 2

Preparation of Electrode Active Material 0.45 g of Si particles having a diameter of about 300 nm and 8 g of acetone were mixed in a 50 ml vial to prepare a mixture. The Si particles of the mixture were dispersed by applying ultrasonic waves. 2 g of a 5 wt % pitch/acetone solution prepared by mixing pitch with acetone were mixed with the resultant mixture. The resultant mixture was dispersed by applying ultrasonic waves for ten minutes, and dried. The resultant mixture was maintained for one hour in a vacuum oven at a temperature of 200° C. to prepare Si particles on which a carbon precursor was coated.

The Si particles on which a carbon precursor was coated was mixed with an aqueous solution prepared by dissolving 1.69 g of the precursor of lithium phosphate of $Li_{1.3\pm0.2}Al_{0.3\pm0.2}Ti_{1.7\pm0.2}(PO_4)_3$ prepared in Synthesis Example 1 in 5 g of distilled water, and were dispersed by applying ultrasonic waves for one hour. Then, the dispersed mixture was stirred in a bath at a temperature of 80° C., and dried. The dried material was heat-treated at a temperature of 850° C. in a nitrogen atmosphere to prepare an electrode active material including a coating layer comprising a first coating layer including a carbonaceous material and a second coating layer including $Li_{1.3\pm3.2}Al_{3.3\pm0.2}Ti_{1.7\pm0.2}(PO_4)_3$, which were sequentially formed on the Si particles. In this case, the amount of the carbonaceous material in the first coating layer was about 100 parts by weight based on 100 parts by the total weight of $Li_{1.3\pm3.2}Al_{0.3\pm0.2}Ti_{1.7\pm0.2}(PO_4)_3$ of the second coating layer.

EXAMPLE 1

Preparation of Negative Electrode 0.03 g of the electrode active material prepared in Preparation Example 1 and 0.15 g of graphite (SFG6, TimCal) were mixed in a mortar to prepare a mixture. The mixture was mixed with 0.4 g of 5 wt % of polyamide-imide (PAI, Torlon®) in N-methylpyrrolidone (NMP) solution by using a binder, and then the resultant mixture was coated on a Cu foil.

The resultant coating was dried in an oven at a temperature of 90° C. for one hour, was rolled in a rolling mill, and then was cured in a vacuum oven at a temperature of 200° C. for one hour, to thus prepare a negative electrode.

EXAMPLE 2

Preparation of Negative Electrode

A negative electrode was prepared in the same manner as in Example 1 except that an electrode active material prepared in Preparation Example 2 was used instead of the electrode active material prepared in Preparation Example 1.

COMPARATIVE EXAMPLE 1

Preparation of Negative Electrode 0.03 g of Si particles having a diameter of about 300 nm and 0.15 g of graphite (SFG6, TimCal) were mixed in a mortar to prepare a mixture. The mixture was mixed with 0.4 g of 5 wt % of PAI (Torlon®) in NMP solution by using a binder, and then the resultant mixture was coated on a Cu foil.

The resultant coating was dried in an oven at a temperature of 90° C. for one hour, was rolled in a rolling mill, and then was cured in a vacuum oven at a temperature of 200° C. for one hour, to thus prepare a negative electrode.

MANUFACTURE EXAMPLE 1

Manufacture of Coin Cell

A 2016-type of coin cell was manufactured by using Li metal as an opposite electrode to the negative electrode prepared in Example 1. The 2016-type of coin cell was charged and discharged with a voltage from about 1.4 V to about 0.02 V.

A mixture solution, in which 1.3 M of $LiPF_6$ was dissolved in ethylene carbonate (EC), diethylene carbonate (DEC) and fluoroethylene carbonate in a volume ratio of 2:6:2 was used as an electrolyte solution.

MANUFACTURE EXAMPLE 2

Manufacture of Coin Cell

A coin cell was manufactured in the same manner as in Manufacture Example 1 except that the negative electrode prepared in Example 2 was used instead of the negative electrode prepared in Example 1.

COMPARATIVE MANUFACTURE EXAMPLE 1

Manufacture of Coin Cell

A coin cell was manufactured in the same manner as in Manufacture Example 1 except that the negative electrode prepared in Comparative Example 1 was used instead of the negative electrode prepared in Example 1.

EVALUATION EXAMPLE

The 2016-type of coin cells manufactured in Manufacture Examples 1 and 2, and Comparative Manufacture Example 1 were charged and discharged with a voltage from about 1.4 V to about 0.02 V.

In a first cycle, the 2016-type of coin cells were charged with a constant current of 0.1 C until a voltage with respect to Li electrodes reached 0.02 V, and then were charged with a constant voltage until the current reached 0.01 C. Then, the 2016-type of coin cells were given a rest for about 10 minutes. The 2016-type of coin cells were discharged with a constant current of 0.1 C until the voltage reached 1.4 V. In a second cycle, the 2016-type of coin cells were charged and discharged up to 50 cycles at the same condition as above except that the static current was 1 C. Then, the lifetime characteristics of the 2016-type of coin cells were evaluated. The evaluation results are shown in Table 1.

In Table 1, charge/discharge efficiency at 1st cycle and a capacity retention rate are defined by Equations 1 and 2 below, respectively 1st-cycle charge/discharge efficiency (%)=(1st-cycle discharge capacity)/(1st-cycle charge capacity)*100   Equation 1

Capacity retention rate (%)=(51st-cycle discharge capacity)/(2nd-cycle discharge capacity)*100   Equation 2

TABLE 1

|  | 1st-cycle discharge capacity (mAh/g) | 1st-cycle charge/discharge efficiency | Capacity retention rate (@2~51 cycle) |
|---|---|---|---|
| Comparative Manufacture Example 1 | 844 | 0.77 | 70% |
| Manufacture Example 1 | 854 | 0.77 | 74% |
| Manufacture Example 2 | 823 | 0.77 | 86% |

As shown in Table 1, the retention rates of the coin cells prepared in Manufacture Examples 1 and 2 are improved compared with the coin cell prepared in Comparative Manufacture Example 1. Thus, a lithium phosphate coating layer including a predetermined amount of carbonic components functions as a protective layer against expansion and contraction of Si particles during charge/discharge.

As described above, according to the one or more of the above embodiments of the invention, electrode active materials having excellent charge/discharge efficiencies and an improved capacity retention rates are provided. A lithium secondary battery including the electrode active material has improved cycle characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the invention have been shown and described, it would be appreciated by those skilled in the art that changes may be made in these embodiments without departing from the principles and spirit of the invention, the scope of which is defined in the claims and their equivalents.

What is claimed is:

1. An electrode active material comprising:
a core active material comprising at least one first material selected from the group consisting of Si, $SiO_a$ ($0<a<2$), an Si alloy, Sn, $SnO_b$ ($0<b\leq2$), and a Sn alloy, or a second material including the first material and at least one selected from the group consisting carbon, metal, and an oxide; and
a coating layer formed on a surface of the core active material, wherein the coating layer comprises a first coating layer including a carbonaceous material and a second coating layer comprising the compound represented by Formula 1 below:

$$Li_xM_y(PO_4)_z, \quad \text{Formula 1}$$

where M is selected from the group consisting of alkali metal, alkaline earth metal, a group 13 element, a group 14 element, a transition metal, a rare earth element, and combinations thereof; $1\leq x\leq 3$, $0\leq y\leq 3$, and $1\leq z\leq 3$.

2. The electrode active material of claim 1, wherein the amount of the carbonaceous material in the first coating layer is from about 5 to about 500 parts by weight based on 100 parts by a total weight of the compound represented by Formula 1 of the second coating layer.

3. The electrode active material of claim 1, wherein, in Formula 1, M is selected from the group consisting of sodium (Na), potassium (K), magnesium (Mg), calcium (Ca), strontium (Sr), nickel (Ni), cobalt (Co), silicon (Si), titanium (Ti), boron (B), aluminum (Al), tin (Sn), manganese (Mn), chromium (Cr), iron (Fe), vanadium (V), zirconium (Zr), yttrium (Y), lanthanum (La), scandium (Sc), indium (In), gallium (Ga), germanium (Ge), and combinations thereof.

4. The electrode active material of claim 1, wherein the thickness of the first coating layer is from about 0.5 to about 200 nm, and wherein the thickness of the second coating layer is from about 0.5 to about 200 nm.

5. A method of preparing the electrode active material of claim 1, the method comprising:
providing a first mixture of a carbonaceous material or a precursor thereof, and a second solvent;
coating and drying the first mixture on a core active material;
providing a second mixture of a compound represented by Formula 1 below or a precursor thereof, and a first solvent;
coating and drying the second mixture on the electrode active material comprising the first coating layer; and
heat-treating the dried mixture:

$$Li_xM_y(PO_4)_z, \quad \text{Formula 1}$$

where M is selected from the group consisting of alkali metal, alkaline earth metal, a group 13 element, a group 14 element, a transition metal, a rare earth element, and combinations thereof; $1\leq x\leq 3$, $0\leq y\leq 3$, and $1\leq z\leq 3$.

6. The method of claim 5, wherein the heat-treating is performed at a temperature from about 150 to about 1500° C.

7. An electrode comprising an electrode active material of claim 1.

8. The electrode of claim 7, wherein the amount of the carbonaceous material of the first coating layer is from about 5 to about 500 parts by weight based on 100 parts by a total weight of the compound represented by Formula 1 of the second coating layer.

9. The electrode of claim 7, wherein, in Formula 1, M may be selected from the group consisting of sodium (Na), potassium (K), magnesium (Mg), calcium (Ca), strontium (Sr), nickel (Ni), cobalt (Co), silicon (Si), titanium (Ti), boron (B), aluminum (Al), tin (Sn), manganese (Mn), chromium (Cr), iron (Fe), vanadium (V), zirconium (Zr), yttrium (Y), lanthanum (La), scandium (Sc), indium (In), gallium (Ga), germanium (Ge), and combinations thereof.

10. The electrode of claim 7, wherein a thickness of the first coating layer is from about 0.5 to about 200 nm, and wherein a thickness of the second coating layer is from about 0.5 to about 200 nm.

11. A lithium secondary battery comprising the electrode of claim 7.

* * * * *